United States Patent [19]

Massmann et al.

[11] Patent Number: 4,941,186
[45] Date of Patent: Jul. 10, 1990

[54] METHOD AND APPARATUS FOR CONCEALING ERRORS WHICH EXTEND OVER SEVERAL PIXELS IN A DIGITAL VIDEO SIGNAL

[75] Inventors: Volker Massmann; Dieter Poetsch, both of Ober-Ramstadt, Fed. Rep. of Germany

[73] Assignee: Robert Bosch GmbH, Stuttgart, Fed. Rep. of Germany

[21] Appl. No.: 395,132

[22] Filed: Aug. 15, 1989

Related U.S. Application Data

[63] Continuation of Ser. No. 111,625, Oct. 21, 1987, abandoned.

[30] Foreign Application Priority Data

Oct. 23, 1986 [DE] Fed. Rep. of Germany ....... 3636077

[51] Int. Cl.$^5$ .............................................. G06K 9/40
[52] U.S. Cl. ...................................... 382/54; 358/166; 358/21 R
[58] Field of Search ..................... 382/50–54; 358/36, 37, 166, 167, 310, 314, 336

[56] References Cited

U.S. PATENT DOCUMENTS

| | | | |
|---|---|---|---|
| 4,199,780 | 4/1980 | Taylor | 358/36 |
| 4,329,708 | 5/1982 | Yamamoto et al. | 358/36 |
| 4,345,272 | 8/1982 | Shirota | 358/310 |
| 4,364,081 | 12/1982 | Hashimoto et al. | 358/327 |
| 4,376,290 | 3/1983 | Shirota | 358/336 |
| 4,429,334 | 1/1984 | Hashimoto et al. | 358/310 |
| 4,463,387 | 7/1984 | Hashimoto et al. | 358/310 |
| 4,488,251 | 12/1984 | Wischermann | 364/724 |
| 4,498,104 | 2/1985 | Schulz | 382/54 |
| 4,517,600 | 5/1985 | Reitmeier | 358/167 |
| 4,586,082 | 4/1986 | Wilkinson | 382/52 |
| 4,656,514 | 4/1987 | Wilkinson et al. | 358/167 |
| 4,734,770 | 3/1988 | Matsuba | 358/36 |

FOREIGN PATENT DOCUMENTS

0101180 2/1986 European Pat. Off. .
2140245 11/1984 United Kingdom .

Primary Examiner—Leo H. Boudreau
Assistant Examiner—Jose L. Couso
Attorney, Agent, or Firm—Frishauf, Holtz, Goodman & Woodward

[57] ABSTRACT

A defect location signal such as has been used on television film scanners to show that presence of scratches or dust specks on the scanned film is utilized to show the horizontal extent as well as the position of a defect affecting successive pixels on a television line. Beginning at some point preceding the defects and ending at some time following the defect, the succession of undisturbed pixel values is time expanded with interpolation of pixel values to the extent necessary to bridge the entire defect region. The spacing between detected defects is measured to control the number of undisturbed pixels at each side of the defect that will be spread apart by interpolated values and likewise the ratio of interpolated values to undisturbed pixels in the expanded signal.

11 Claims, 5 Drawing Sheets

METHOD AND APPARATUS FOR CONCEALING ERRORS WHICH EXTEND OVER SEVERAL PIXELS IN A DIGITAL VIDEO SIGNAL

This application is a continuation of application Ser. No. 07/111,625, filed Oct 21, 1987 now abandoned.

This invention concerns smoothing over defects ("errors") in a digital video signal by replacing disturbed picture point elements, hereinafter referred to as "pixels", by information derived from neighbouring undisturbed pixels. There are already methods and devices for so doing, but these leave much to be desired for cases where a succession of neighbouring pixels are disturbed enough for the corresponding parts of the video signal to be unusable.

Defects in the video signal can arise, for example, from signal dropouts, in reproduction from magnetically stored video signals or in the scanning of motion picture film or television transmission. For the concealing of these defects, for example scratches or dust specks which disturb film scanning, a signal is produced by a detection circuit suitable for the purpose which provides information regarding the position and magnitude of the defective location. This is illustrated for example in German Patent No. 33 18 216. This signal makes it possible, for example, to replace this defective location in a picture with information from the preceding film picture. If the preceding film frame is likewise disturbed at the same location, as for instance in the case of vertically running scratches (socalled motion stripes), this method fails. It is, moreover, unsuitable if the content of the preceding picture field or frame is not identical with that of the current picture field or frame, as may be the case if there is movement in the picture or a change of scene.

For mitigation of these disadvantages, it is already known, from European Patent No. 0 101 180, to utilize signals derived from the defect location to interpolate between two undisturbed pixels at the edges of the defect location and thus to cover over the defect. This method leaves the problem, however, especially in the case of broad scratches, that the interpolated zone of fixed location may be made prominent over the rest of the picture content because of the selected method of interpolation. Furthermore, in these cases oblique edges are broken up for the width of the scratch and vertical edges are smeared horizontally. If the disturbance (defect) location signal is slightly narrower than the location of the disturbance itself, this method leads to erroneous interpolation that can be just as disturbing as the original defect.

SUMMARY OF THE INVENTION

It is an object of the present invention to improve the smoothing over or concealment of errors compared to the above-mentioned simple interpolation in the case of defects wider than a single pixel.

Briefly, the video signal outside and adjacent to the disturbed location is time-expanded with insertion of interpolated pixel values so that the expanded signal will extend over gap in the sequence of undisturbed pixels. This method has an advantage, resulting from an improved interpolation method, that the smoothing over of the disturbance is in practice hardly visible and, in particular, the breaking up of oblique edges as well as the smearing of vertical edges are prevented or greatly reduced.

In particular, it is advantageous to expand the undisturbed video signal on both sides of the disturbance sufficiently for them to cover the disturbed region. The pixel values produced by interpolation can be intercalated on a 1:1 basis if enough undisturbed pixels are available for the necessary expansion. If the spacing between disturbances is not large thus limiting the undisturbed pixel succession available for expansion, the number of interpolated pixel values used for expansion between successive undisturbed pixels may be augmented as the center of the disturbed area is approached and thereafter decreased. It is furthermore possible to combine the method just summarized and apparatus therefor with low pass filtering of the time-expanded video signals effective either in the horizontal direction or in the vertical direction, or in both these directions, with blending in of the filtered signals.

BRIEF DESCRIPTION OF THE DRAWINGS

The invention is further described by way of illustrative example with reference to the annexed drawing, in which.

DESCRIPTION OF THE ILLUSTRATED EMBODIMENTS

Figure 1:
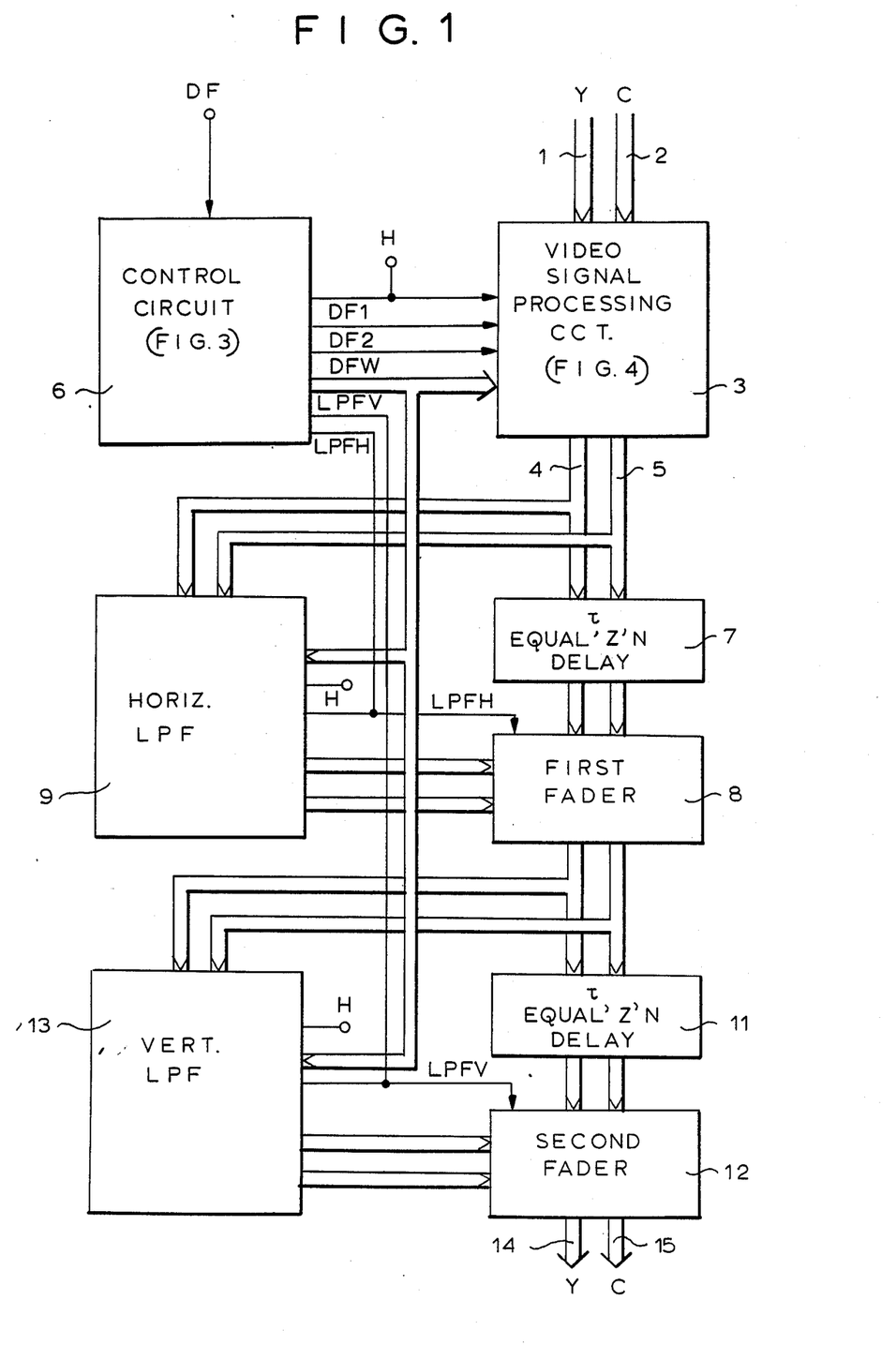
FIG. 1 is a block circuit diagram of apparatus for carrying out the method of the invention.

In the circuit shown in block form in FIG. 1 a digital luminance signal Y and a digital chrominance signal C are supplied respectively over the signal lines 1 and 2 to a video signal processing circuit 3. In the case of a film scanning equipment the digital signals Y and C are produced by analog to digital conversion of the video signals resulting from film scanning. The nature of the processing in the circuit 3 can be preliminarily described by reference to FIG. 2 in connection with smoothing over of a disturbed location F illustrated in line a of FIG. 2. The desired processing produces a video signal corrected for local defects either as shown in line b or else as shown in line c (of FIG. 2). That corrected signal is made available at the outputs 4 and 5 which respectively supply corrected luminance and chrominance signals.

Figure 2:
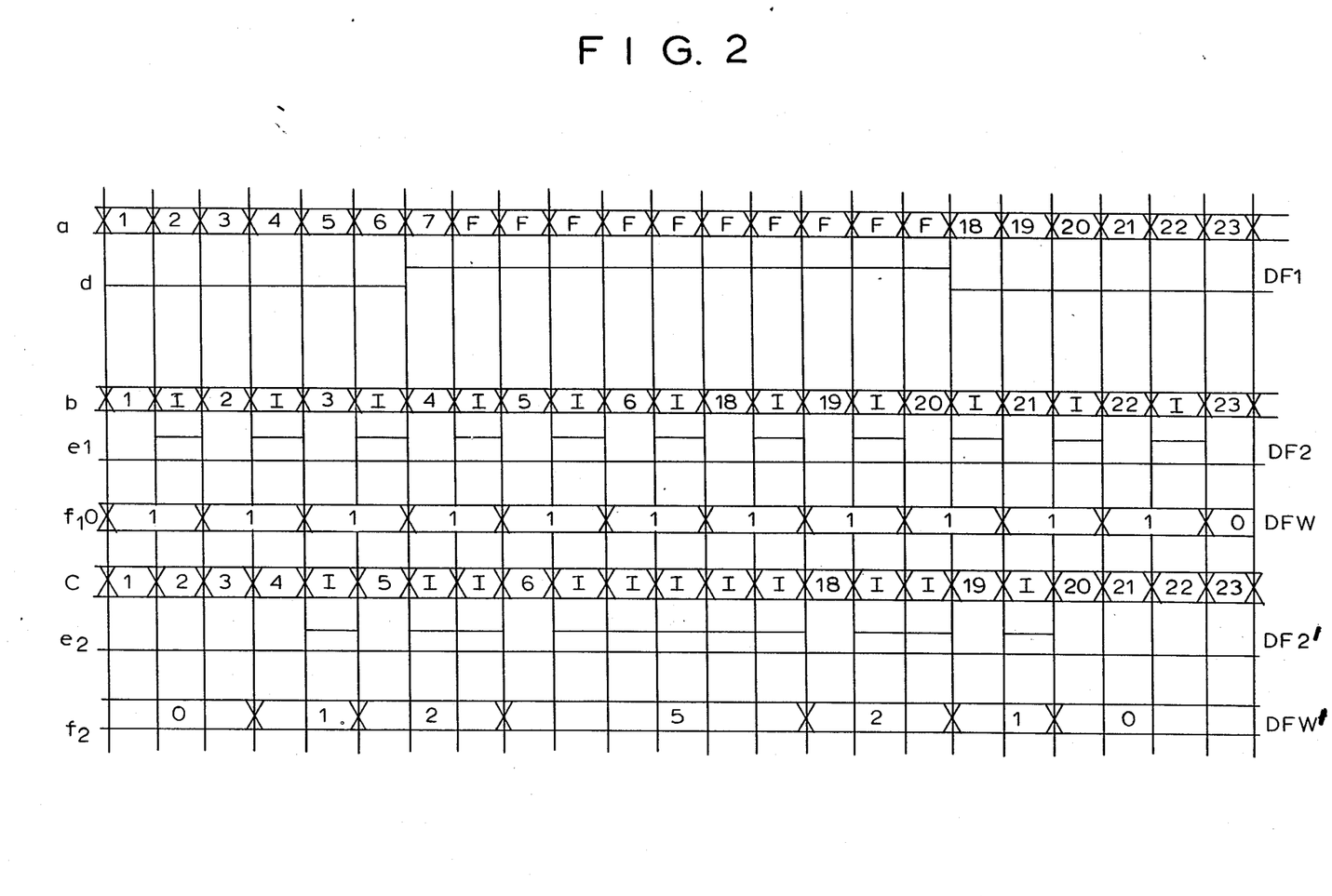
FIG. 2 is a graph illustrating signals occurring in the circuit of FIG. 1 on a common time scale.

In line a of FIG. 2 there is shown a picture line having, at the left, six undisturbed pixels (pixels 1 to 6), 11 disturbed pixels (F) in the middle and, at the right, six more undisturbed pixels (pixels 18 to 23). A corrected video signal, shown on line b of FIG. 2, has an interpolated pixel I inserted between every two successive undisturbed pixels. Each interpolated pixel I is derived from the two adjacent undisturbed pixels.

A control signal generation circuit 6 produces control signals (DF1, DF2 and DFW) which are shown respectively on lines d, $e_1$ and $f_1$ of FIG. 2. In this case an expansion of the undisturbed video signal by the fixed expansion factor 2 is carried out to cover over the location of the disturbed pixels. The expansion factor can be reduced, for the same width of the disturbed region, by increasing the width of the portion of the picture line which is expanded (i.e., while inserting interpolated values less frequently).

Line c of FIG. 2 shows another advantageous variant of the expansion of the undisturbed part of a video signal which has the same disturbed portion shown in line a of FIG. 2, but in this case the expansion factor rises, on account of the control signals DF2' and DFW' shown in lines $e_2$ and $f_2$ of FIG. 2, as the center of disturbance is approached (a first interpolated value lies between pixels 4 and 5, two additional interpolated values lie between pixels 5 and 6 and then five interpolated values between the pixels 6 and 18). After the center of the disturbances is passed the expansion factor decreases. In this method the transition between the values on the edges of the disturbance region (pixels 6 and 18) is smoother and the expanded picture area includes only a narrow strip on each side of the defective area covered.

The video signals made available at the outputs 4 and 5 are, as shown in FIG. 1, furnished in parallel to two signal branches. On the one hand, they proceed, through a delay circuit 7 for equalizing the propagation time of the other branch, to the first imput of a first fader 8 and, on the other hand, they go through a "horizontal" low pass filter 9 which is variable in its cut-off frequency and then to the second input of the first fader 8. Faders are well known devices for fading one picture in while another is faded out either in space (blending in an insert) or in time (fading in a new scene).

The output of the first fader 8 is also split, going on the one hand through a second propagation time equalizing delay 11 to a first input of a second fader 12 and on the other hand going through a "vertical" low pass filter 13 of variable cut-off frequency and then to a second input of the second fader 12. The fading time of the faders 8 and 12 for fading between the first and second inputs is in each case of about the duration two intervals at which successive pixels arrive. The low pass filtering which is produced respectively in the horizontal and in the vertical direction is of value for improving the viewer's impression of the picture in the neighborhood of the detected defect. Such filtering of digital video signals is a known technique (which usually involves non-recursive digital filtering) and the provision of digital filters of variable order (i.e. of variable cut-off frequency) is illustrated in U.S. Pat. No. 4,488,251.

The cut-off frequencies of the filters 9 and 13 are dependent upon the geometric dimensions of the detected defect. The vertical low pass filter 13 particularly improves the reproduction of diagonal picture structures. An extensively improved video signal composed of a luminance signal Y and a chrominance signal C, both corrected over the defect location, is accordingly obtainable at the outputs 14 and 15 of the second fader 12. The faders fade in the corrected signals in filtered form in the region of the detected defect, under control of a signal generated in the circuit 6 which controls both the variable filter and the fader, as shown by the connections of the control signals LPFV and LPFH in FIG. 1.

Figure 3:
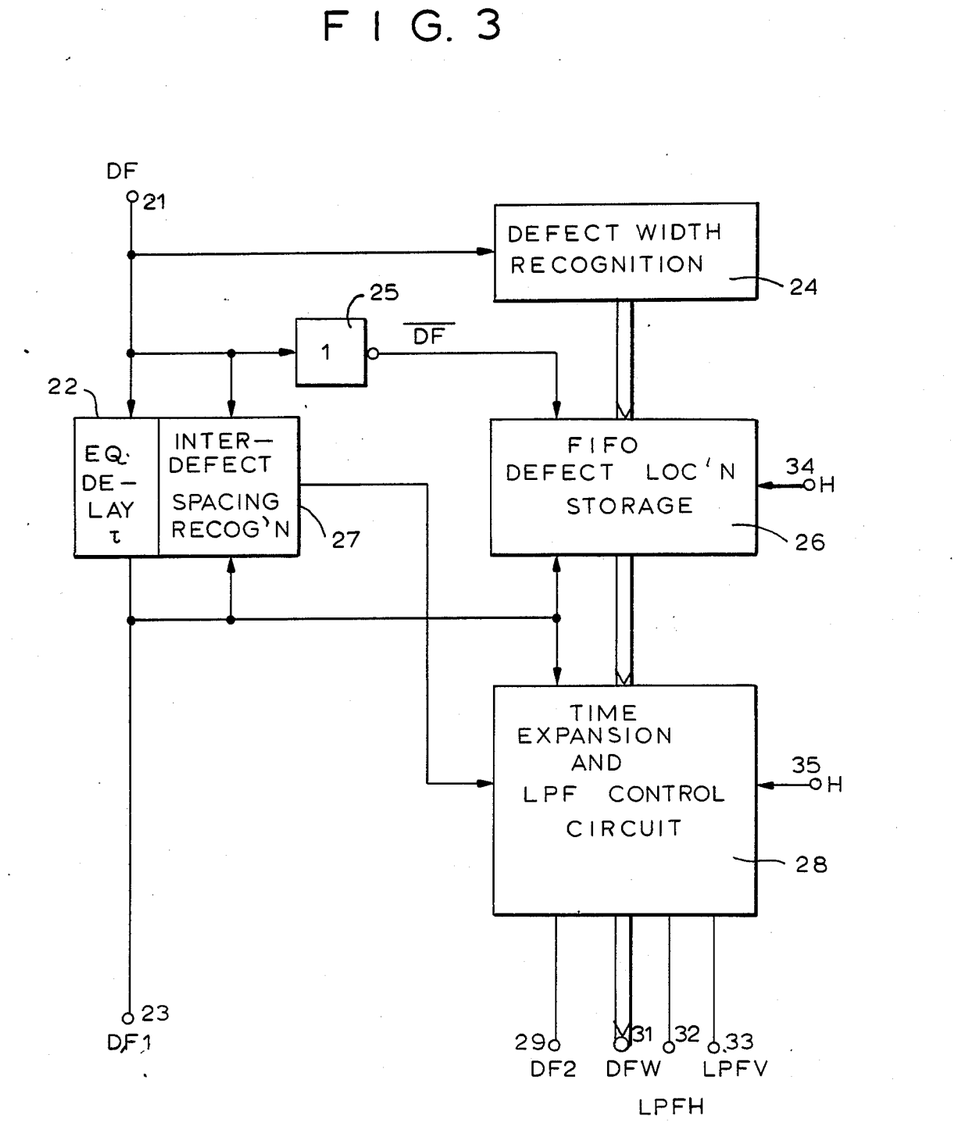
FIG. 3 is a block circuit diagram of a portion of the circuit of FIG. 1 in which the control signals are generated.

The generation of control signals for the video signal processing for concealing defect locations is further explained with reference to the circuit block diagram of FIG. 3. The defect location signal DF available at the terminal 21 is typically of a kind produced in known devices for recognition of scratches or dust specks on a film being processed by a film scanner of a television broadcast station or television studio. Subjecting the signal DF to a simple delay by means of the propagation time equalizing stage 22 produces the delayed defect location signal DF1 shown on line d of FIG. 2, which is available at the output 23 at the lower left of FIG. 3. The defect location signal DF is also supplied immediately to a circuit 24 for indication of the width of the defect by a suitable signal. This width information supplied by the multibit output of the recognition circuit 24 is stored in a FIFO defect location storage unit 26, which is also supplied with the inverted defect location signal $\overline{DF}$ obtained through an inverter 25. The delayed defect location signal DF1 is also supplied to the FIFO storage unit 26.

A circuit 27 for recognizing the spacing between defect locations is also provided, to which there are supplied both the defect location system signal DF and the delayed defect location signal DF1 produced by the delay circuit 22. This circuit measures the interval between successively detected defect locations and provides that information for the next circuit to be described, which is the expansion and low pass filtering control signal generator 28. The latter circuit also receives the defect width information from the FIFO storage unit 26. From these imputs the circuit 28 produces a defect location control signal DF2 or DF2' furnished to terminal 29 and a related width information signal DFW or DFW' supplied at the output 31. The pulses DF2' can be generated by a circuit including a counter and a PROM so that the sum of the lengths of these pulses (line $e_2$ of FIG. 2) is equal to the length of the defect location pulse DF1 (line d of FIG. 2). That relation also holds true for the pulses DF2 (line $e_1$, of FIG. 2) which provide broader expansion. The information regarding the spacing between successive defect locations is important and necessary, because the width of the wider-than-defect location covered by the processing depends thereon. The smaller the spacing between the defects is found to be, the shorter the "expansion" of the defect location carried out by processing must be.

The circuit 28 also generates the fading control signals LPFH and LPFV (supplied respectively at terminals 32 and 33) for fading in and out the filtered video signals produced by the horizontal and vertical low-pass filters 9 and 13. Horizontal scanning frequency pulse signals are supplied to the storage unit 26 and to the control circuit 28 respectively over terminals 34 and 35 for synchronization with the television line rhythm. The reading out from the FIFO storage unit 26 is produced by the delayed defect location signal DF1. The output signals of the expansion control signal circuit 28 are correlated with DF1 in the manner illustrated in FIG. 2.

Figure 4:
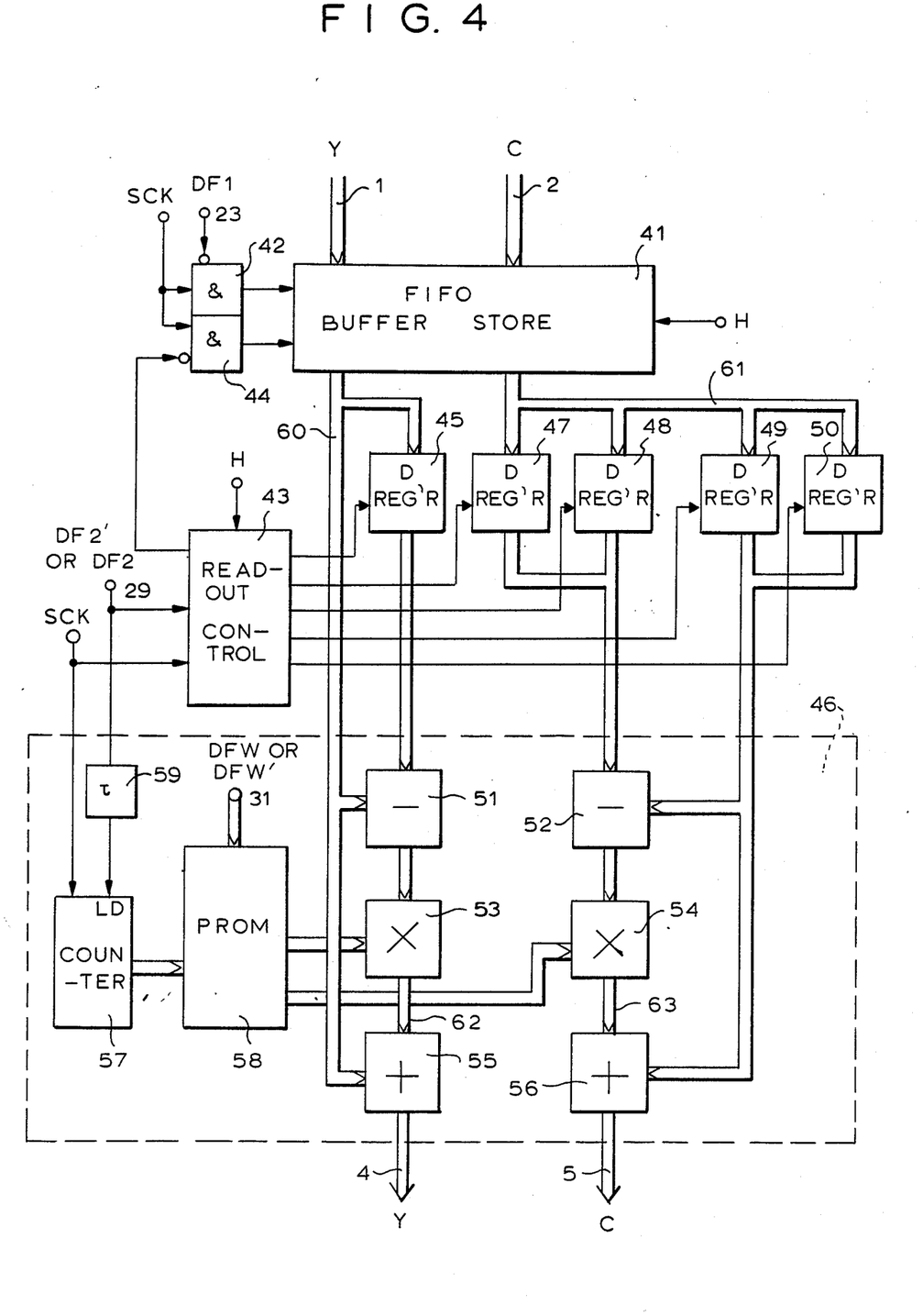
FIG. 4 is a block circuit diagram of the video signal processing circuit 3 of FIG. 1.

FIG. 4 shows a block circuit diagram corresponding to the unitary unit block 3 shown in FIG. 1 for the video signal processing. Those components already identified in the foregoing which also appear in FIG. 4 are given the same reference numerals in FIG. 4. The luminance signal Y and the chrominance C are supplied over the lines 1 and 2 to a buffer storage unit 41 in which, however, only the undisturbed pixels are stored as a result of control of the write-in pulses by means of the signal DF1 from the terminal 23. The clock signals SCK and the delayed defect signal DF1 go to the AND circuit 42, which provides a clock signal output only when DF1 is at its low value. The small circle at one input of the AND circuit 42 designates inversion of DF1 there. The reading out of the stored pixel values is controlled in a similar way by the inverted control signal DF2 or DF2' available from terminal 29 over the readout control circuit (43) and the connection 64. The readout control circuit 43 is synchronized with the horizontal frequency pulse signal in FIG. 4.

The data read out of the buffer storage unit 41, either directly or through the D registers 45–50, are then supplied to the interpolator 46 designated by a rectangular broken-line enclosure 46 in FIG. 4, in the following manner. The luminance signals are supplied on the one hand directly and on the other hand through a D register 45 having a storage time of 1 pixel interval. The chrominance signals are read out into four D registers 47, 48, 49 and 50. Register 47 stores the last R-Y pixel value, register 48 the last B-Y value, Register 49 the first R-Y value and register 50 the first B-Y value. Undisturbed pixels go directly through the register 50 and the adding circuit 56 to the chrominance (C) output 5. The D-Registers are controlled so that either content of the register 47 or that of the register 48 and either the content of the register 49 or that of the register 50 are supplied to the interpolator 46. For the time slots of the interpolated pixel values designated I in FIG. 2 the necessary support values are prepared for the interpolator 46 in the D registers 45, 47, 48, 49 and 50, namely two support values for the luminance signal Y and four support values for the chrominance signal C.

The interpolator 46 consists essentially of a pair of subtraction stages 51 and 52, a pair of multiplier stages 53 and 54 and a pair of addition stages 55 and 56, as well a coefficient control circuit consisting of a counter 57 and a programmable read-only memory (PROM) 58. The subtraction stages 51 and 52 each produce the difference between the pixel values supplied at their inputs and supply that difference to the corresponding multipliers 53 and 54, where they are weighted with the interpolation coefficients stored in the PROM 58, which are dependent on the size of the width of the defect (control signal DFW or DFW' at the terminal 31) and the state of the counter 57. For the duration of the defect location control signal DF2 or DF2', which is supplied from the terminal 29 through the propagation time equalizing circuit 59 to the counter 57, the content of the counter 57 increases at the data clock rate SCK of the luminance signal and the stored interpolation coefficients are called out in accordance with the counter content.

The weighted difference signals at the output of the multiplier stages 53 and 54 are respectively supplied to first inputs of the addition stages 55 and 56, at the respective second inputs of which another signal corresponding to the next pixel is applied. At the outputs 4 and 5 of the interpolator 46, there are, in some cases, signals of undisturbed pixels, resulting from a null interpolation coefficient supplied by the PROM 58 and, in some cases, interpolated pixel signals derived from undisturbed pixel signals.

Figure 5:
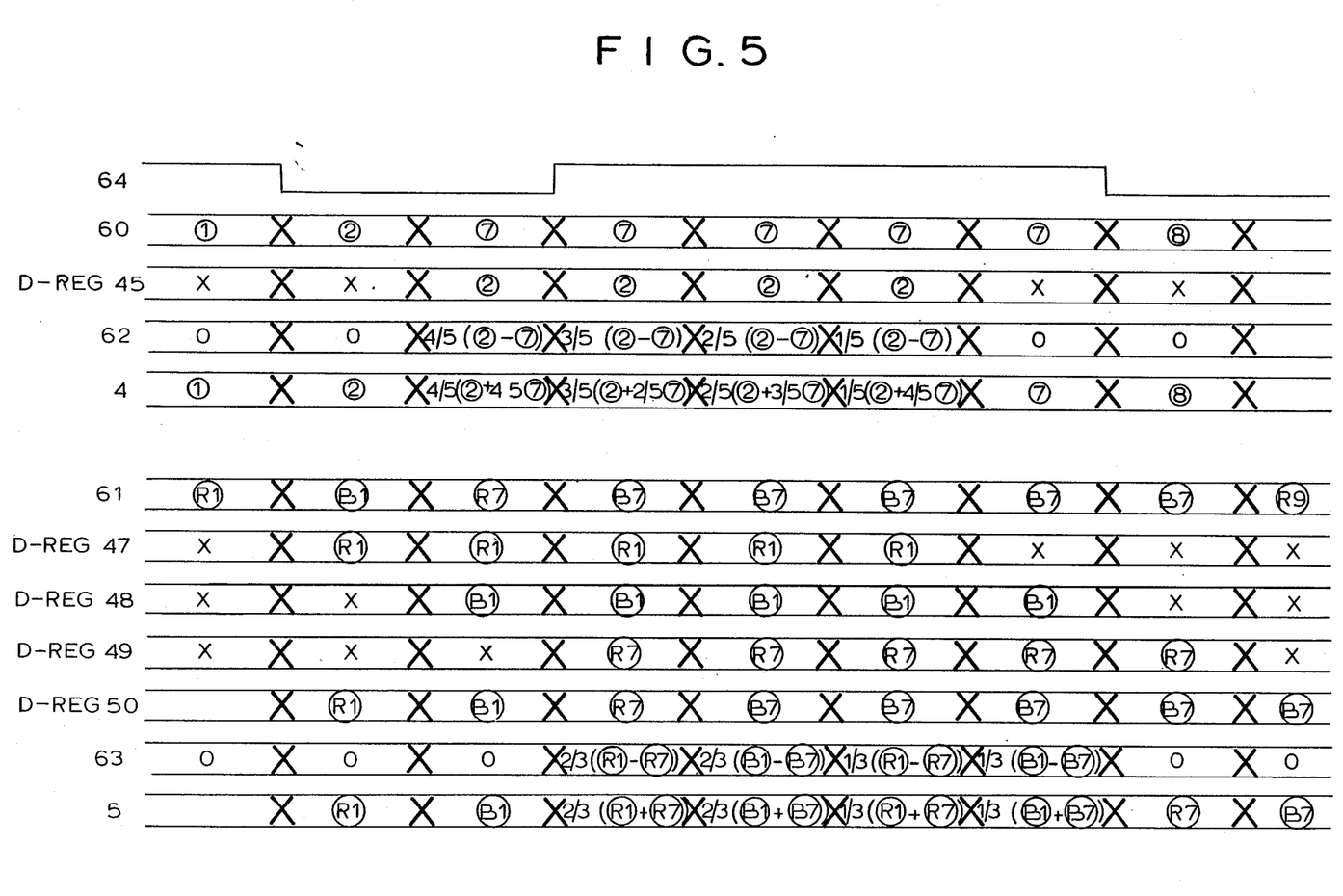
FIG. 5 is a graph illustrating the processing in FIG. 4 of a video defect extending over four pixels.

FIG. 5 illustrates, in a manner similar to FIG. 2, but adapted to the processing described in connection with FIG. 4, the case of a signal in which a defect extending over four adjoining pixels is detected. This is shown for only horizontal pixel sequences.

The first line shows a modified defect location signal which appears on the connection line 64 in FIG. 4.

The second line shows the read-out from the FIFO storage unit 41, with the pixel value 7 repeated during the interval covered by the defect.

The third line shows the content of the D register 45 for the pixel intervals which provide the common time scale of all of the lines of FIG. 5. The values "x" represent values that will not be used and therefore do not matter ("don't care values).

The fourth line of FIG. 5 shows the output of the multiplier 53 on the multibit line 62 between the multiplier 53 and the adder 55. In this case the multiplying factor, and therefore the product value, is 0 for the first two intervals shown and also for the last two whereas for the four in between the products are respectively 4/5 of the difference (2)−(7), 3/5, 2/5 and 1/5 of that difference.

On the fifth line of FIG. 5 is the output 4 of the adder 55 for the luminance signal Y, in which the first two and the last two intervals are occupied by the undisturbed values appearing in those intervals in the second line of FIG. 5. The interpolated values now become 4/5 of 2+1/5 of 7, 3/5 of 2+2/5 of 7, 2/5 of 2+3/5 of 7 and 1/5 of 2+4/5 of 7.

The sixth through the twelfth lines of FIG. 5 illustrate the processing of the chrominance signal. On the sixth line of FIG. 5 there appear alternately R-Y and B-Y signals abbreviated as R and B in FIG. 5, the circled numbers corresponding to the values of luminance signal shown in the second line of FIG. 5. The seventh line of FIG. 5 shows the content of the register 47. The values designated as "x", as in the case of the third line of FIG. 5, are "don't care" values, since they will not appear at the output of the processor.

The eighth line of FIG. 5 shows the content of the register 48, while the ninth and tenth lines of FIG. 5 respectively show the contents of the registers 49 and 50.

The eleventh line of FIG. 5 shows the output on the line 63 of the multiplier 54, which is 0 for the first three pixel intervals and for the last two, and, for the other four pixels, respectively ⅔ and ⅓ of the difference between $R_1$ and $R_7$ and ⅔ and ⅓ of the difference between $B_1$ and $B_7$. Finally, the twelfth line of FIG. 5 shows the chrominance signal which appears at the output 5 of the adder 56. The interpolated values that appear there are, respectively, ⅔$R_1$+⅓$R_7$, ⅔$B_1$+⅓$B_7$, ⅓$R_1$+⅔$R_7$ and ⅓$B_1$+⅔$B_7$ and are preceded by the undisturbed pixels $R_1$ and $B_1$ delayed by one chrominance pixel interval and are followed by more undisturbed chrominance pixels.

Although the invention has been described with reference to particular illustrated embodiments, it will be understood that variations and modifications are possible within the inventive concept.

We claim:
1. Method of concealing errors in a digital video signal by replacing disturbed pixel values with values derived from neighboring undisturbed pixel values, comprising the steps of:

detecting disturbed pixel values in a manner indicating pixel disturbance width (DFW) of a disturbance affecting values of a plurality of adjoining pixels in the same horizontal line as well as indicating pixel disturbance location (DF, DF1, DF2) of said pixels of affected value and     time-expanding the video signal of said same horizontal line outside of and adjacent to said plurality of adjoining pixels of said same line having disturbed values, by inserting in said video signal, between successive pixels of undisturbed value in said same line, interpolated pixel values derived from values of said successive pixels of said same line between which said derived pixel values are inserted, whereby said interpolated pixel values are horizontally interlaced with pixels of undisturbed values, and performing said time-expansion of said video signal in such a measure that a portion of the time-expanded video signal of said same line replaces all successive pixels of disturbed value of a disturbance in said same line for which pixel disturbance with and pixel disturbance location has been detected.

2. Method as defined in claim 1, wherein the video signal is time-expanded both before and after the portions of said signal represented by said adjoining pixels of disturbed value, the expansion of said video signal being symmetrical with respect to the replaced pixels of disturbed value.

3. Method as defined in claim 1, wherein a single interpolated pixel value is in every case inserted between successive pairs of undisturbed pixels, whereby the ratio of interlacing interpolated and undisturbed pixel values is 1:1.

4. Method as defined in claim 1, wherein the number of interpolated pixel values inserted between successive undisturbed pixels symmetrically rises and falls between the beginning and the end of time expanded video signals of a television line bridging a detected sequence of disturbed pixel values.

5. Method as defined in claim 1, wherein at least said portion of said time-expanded video signal replacing said pixels of diturbed value is subjected to low pass filtering both in the horizontal and in the vertical direction.

6. Method of concealing errors in a digital video signal by replacing disturbed pixel values with values derived from neighboring undisturbed pixel values, comprising the steps of:

detecting disturbed pixel values in a manner indicating pixel disturbance width of a disturbance affecting values of a plurality of adjoining pixels as well as the location of said pixels of affected value by producing a defect location signal (DF1) indicating both the beginning and the end of a sequence of disturbed pixel values by a change of state, storing information of the pulse width of said defect location signal (DF1), measuring the spacing between successive defect location signals (DF1) by delaying the earlier one thereof and then obtaining a defect location control signal (DF2, DF2') from the information of said stored pulse width and of the spacing between successive defect location signals, and time-expanding the video signal outside of and adjacent to said plurality of adjoining pixels having disturbed values by inserting in said video signal, between successive pixels of undisturbed value, interpolated pixel values derived from values of said successive pixels between which said derived pixel values are inserted, whereby said interpolated pixel values are interlaced with pixels of undisturbed values, said time-expansion of said video signal being performed in such a measure that a portion of the time-expanded video signal replacess all successive pixels of disturbed value of a disturbance for which pixel disturbance width and pixel disturbance location has been detected, by utilizing said defect location control signal (DF2, DF2') for control of the expansion of at least one region of successive undisturbed pixel values bordering the disturbed pixels designated by said defect location signal (DF1).

7. Method as defined in claim 6, wherein pixels of said video signal, other than pixels identified by said defect location signal (DF1) as disturbed pixels, are stored and then read out from storage pixel by pixel and wherein, after the beginning of a said defect location control signal (DF2, DF2') there is inserted at least one interpolated pixel value between successive pixels that are read out as aforesaid from storage.

8. Method as defined in claim 7, wherein for producing interpolated pixel values, the difference between two successive pixel values read out from storage is obtained by delaying of the earlier read-out pixel with respect to the next value by one pixel interval, then weighting of said difference with a factor and then adding the obtained weighted difference algebraically to the later one of said two successive read-out pixel values.

9. Method as defined in claim 1, wherein the video signal comprises luminance and chrominance components and wherein the step of time expanding the digital video signal is performed both for digital luminance and digital chrominance components.

10. Apparatus for concealing errors in a digital color television video signal comprising:

buffer storage means (41) for storing said digital video signal and having a luminance signal output and a chrominance signal output;

means for detecting sequences of disturbed pixel values, for producing a defect location signal (DF1) indicative of the beginning and end of each said sequence and for thereby controlling the storing of said digital video signal in said buffer storage means with exclusion of disturbed pixel values from storage;

means for deriving, from the interval between beginning and end of a said sequence indicated by said defect location signal (DF1) and from the interval between successive defect location signals, a defect location control signal (DF2, DF2') for time expanding video signals preceding and following a succession of disturbed pixel values detected by said detecting means;

means for applying said defect location control signal to said buffer storage means for reading out the video signals stored therein;

means for producing time expansion of said video signals by insertion, between successive undisturbed pixels, of at least one pixel value derived by interpolation between the respective values of successive pixels between which the interpolated value is inserted;

a first subtraction stage (51) and first D register (45) connected to said luminance output of said buffer storage means, a first input of said first subtraction stage being connected to said luminance signal output directly and a second input of said first subtraction stage being connected to said luminance signal output through first D register (45), said first D register having means for providing a delay of one pixel arrival interval between said luminance signal output and said second input of said first subtraction stage;

a second subtraction stage (52) and second, third, fourth and fifth D registers (47 . . . 50), said second subtraction stage having a first input connected to said chrominance signal output of said buffer storage means through said second and third D registers (47, 48) and having a second input connected to said chrominance output of said buffer storage means through said fourth and fifth D registers (49,50), said fourth and fifth D registers having means for providing buffer storage therein for a period exceeding the storage period in said second and third D registers by one pixel arrival interval;

a PROM (58) wherein multiplying factors for interpolation are stored;

first and second multipliers stages (53, 54) respectively having first inputs respectively connected to the outputs of said first and second subtraction stages (51, 52) and having second inputs connected to the output of said PROM (58) wherein multiplying factors for interpolation are stored;

counting means (57) controlled by said defect location control signal (DF2, DF2') for controlling said PROM (58);

first and second addition stages (55, 56), said first addition sage 55 having a first input connected to the output of said first multiplier (53) and a second input connected to said luminance signal output of said buffer storage means (41) and having an output for providing expanded luminance signals and said second addition stage (56) having a first input connected to the output of said second multiplier (54) and a second input connected to the output of said fourth and fifth D registers and having an output for providing expanded chrominance signals, and D register control means responsive to said defect location control signal, responsive to clock signals which are also used for advancing said counting means (57) and synchronized to synchronizing signals of a scanning frequency of said digital video signals, for timing the operation of said first to fifth D registers and for selectively operating simultaneously either of said second and fourth D registers or said third and fifth D registers.

11. The apparatus as defined in claim 10 comprising also horizontal low pass digital filter means, vertical low pass digital filter means, first signal fader-blender means (8) and second signal fader-blender means (12) and means responsive to said defect location signal (DF1) for controlling said digital filter means with respect to their cut-off frequency and for controlling aid fader-blender means for substituting digital filter output signals for input signals not subjected to digital filtering, and first and second propagation time equalizing delay means, said first fader-blender means (8) having first inputs connected through said first propagation time equalizing time delay means respectively to said outputs of said first and second addition means, and having second inputs connected respectively to said outputs of said first and second addition means (55, 56) through said horizontal direction digital filter means (9), said second fader-blender means (12) having first inputs connected through said second propagation time equalization delay means (11) respectively to outputs of said first fader-blender means (8) and second inputs connected through said vertical direction digital filter mans (13) respectively to said outputs of said first fader-blender means (8), said second fader blender means (12) having outputs respectively providing luminance and chrominance signals for further transmission and/or processing.

* * * * *